No. 626,886. Patented June 13, 1899.
L. H. BROOME.
BOTTLE STOPPER.
(Application filed Nov. 28, 1898.)
(No Model.)

Witnesses
Chas. H. Smith
J. Staib

Inventor
Lewis H. Broome
Per L. W. Serrell & Son
Atty.

THE NORRIS PETERS CO., PHOTO-LITHO., WASHINGTON, D. C.

UNITED STATES PATENT OFFICE.

LEWIS H. BROOME, OF JERSEY CITY, NEW JERSEY.

BOTTLE-STOPPER.

SPECIFICATION forming part of Letters Patent No. 626,886, dated June 13, 1899.

Application filed November 28, 1898. Serial No. 697,575. (No model.)

*To all whom it may concern:*

Be it known that I, LEWIS H. BROOME, a citizen of the United States, residing at Jersey City, in the county of Hudson and State of New Jersey, have invented an Improvement in Bottle-Stoppers, of which the following is a specification.

This bottle-stopper is especially intended for aerated liquids, in which the stopper has to be introduced through the head that is hollow and through which the liquid under pressure is conveyed to the bottle in order that the stopper may be inserted and held in the bottle against the pressure of the aerated liquid.

In bottle-stoppers heretofore constructed a plate of aluminium or other suitable material has intervened between the inner end of the rubber stopper and the contents of the bottle to prevent the contents being injured by contact with the india-rubber; but it has been difficult to hold such plate in position, and the prongs that have been employed for passing into the rubber have been liable to injury and also to interfere with the tight fitting of the rubber stopper in the bottle-neck.

In my present improvement there is a protecting-plate of aluminium or other suitable material on the inner end of the rubber stopper, the same being slightly smaller than the interior of the neck or mouth of the bottle, so as not to interfere with the rubber stopper being perfectly tight in the bottle, and the rubber stopper is made hollow and a plate introduced within the hollow of the stopper, and a rivet passes through the rubber of the stopper and through the plate within the hollow stopper and is riveted up, so as to confine the two plates, one at each side of the rubber of the stopper, and the connecting device for holding the stopper in position is in the form of a wire with one end coiled and passing into the hollow portion of the stopper, and the other end is formed with a peculiar hook, beneath which the bail-wire is sprung.

Figure 3:
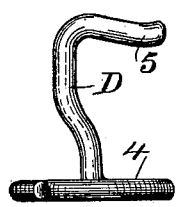
Figure 1:
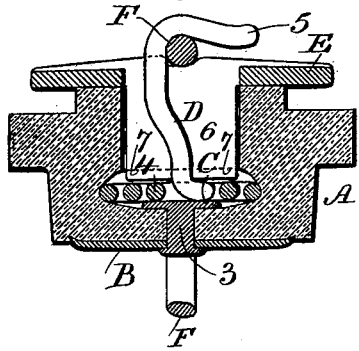
Figure 2:
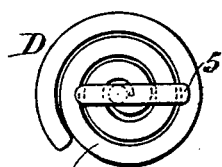
Figure 4:
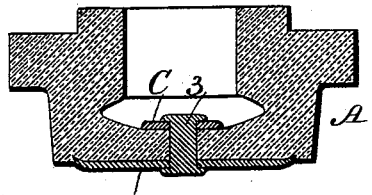
Figure 5:
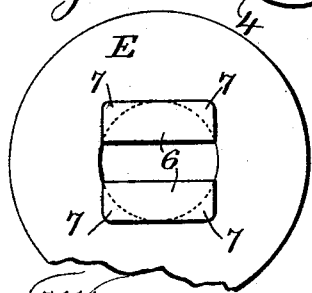
Figure 6:
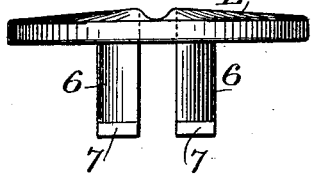

In the drawings, Figure 1 is a vertical section of the stopper, and Fig. 2 is a plan view of the wire connection for the bail. Fig. 3 is an elevation of the wire detached, and Fig. 4 shows the rubber separately. Fig. 5 is an inverted plan, and Fig. 6 a side view, of the stopper-plate.

The rubber stopper A is of a size and shape adapted to be pressed into the mouth or neck of a bottle, and it is hollow, and there is a protecting-plate B over the inner end of the stopper, the same being of slightly less diameter than the interior diameter of the bottle mouth or neck, and there is a second plate C within the hollow of the rubber stopper, and the rivet 3 passes from the protecting-plate through the second plate, and the wire is riveted up or clenched to secure the two plates firmly together at the opposite sides of the rubber of the stopper.

It is to be understood that the rivet 3 may be either integral with the protecting-plate B or soldered or otherwise permanently attached to the same so as to prevent the risk of leakage, and the rivet is advantageously passed through the pierced and extended hole in the rubber, so that the rubber contracts around the rivet and makes a tight joint, and this is promoted by the compression of the rubber between the protecting-plate B and the second plate C as the rivet 3 is headed up or clenched above the second plate C in firmly connecting the two parts.

The hollow or cavity in the rubber stopper is advantageously made with an undercut portion, the diameter of the cavity at the upper part being less than the diameter of the cavity at the lower part, and into this cavity the wire connection D for the bail-wire F is inserted. This wire connection D is formed with a hook 5 at the upper end and with a volute or coil 4 at the lower end, such coil resting upon the second plate C and being within the larger portion of the cavity in the rubber stopper. Hence in inserting the stopper after the aerated liquid has been filled into the bottle a plunger or presser that is hollow or split to receive the wire of the hook 5 can be made use of, the end of the presser acting upon the coil 4 and the plate C to press the same into the bottle mouth or neck and carry with it the rubber stopper A for reliably closing the bottle and confining the contents thereof.

The device for holding the rubber stopper in position until the bail-wire is passed into the hook 5 can be of any ordinary character and is well known in bottling establishments; but as soon as the bottle and its stopper are sufficiently clear of the devices of the bottling-machine the plate E, with a mortise through it, is applied upon the rubber of the stopper, the hook 5 passing through such mortise. The end of the hook is bent away from this plate, so that the bail F can be forced laterally between the hook and the plate, and in so doing the hook itself will be pushed back and the point swung up to more easily allow the bail-wire to pass under the hook, and in doing this the india-rubber is slightly compressed, so that there will be a friction between the plate, hook, and bail-wire to prevent the stopper slipping along on the bail-wire when the stopper is opened, as set forth and claimed in an application of date corresponding to this application.

When the bottle is to be refilled, the hook can be slipped off the bail and with it the stopper, so that said stopper, with its hook, can be reapplied, as aforesaid, after the bottle has been filled, and it is only necessary to swing the bail up and reënter it under the hook in securing the stopper in position.

The stopper-plate E may be of any desired character. I prefer to make the same with two downwardly-extending flanges 6, that pass into the recess of the rubber one at each side of the hook, so as to hold the plate in its proper position on the rubber stopper, and it is advantageous to have projecting spurs 7 at the lower corners of these flanges to aid in holding the parts in position.

I claim as my invention—

1. The combination with the hollow rubber stopper, of a protecting-plate below the lower end and slightly smaller than the mouth or neck of the bottle, a second plate at the bottom of the recess in the hollow stopper and a connection passing through the rubber and uniting the two plates permanently together for securely holding the protecting-plate against the under surface of the hollow rubber stopper, substantially as set forth.

2. The combination with the hollow rubber stopper having a recess within it that is the largest at the lower end and a bail-wire and a plate resting upon the rubber, of a connection passing up from the lower part of the recess in the rubber stopper and extending over the bail-wire, so that the rubber is slightly compressed, and a friction applied to the bail-wire to hold the stopper in position on said bail-wire, substantially as set forth.

3. The combination with a hollow rubber stopper having a recess within it that is largest at the lower end, of a wire having a volute coil at its lower end to fit within the recess of the stopper and at the bottom thereof, and a hook at the upper end extending approximately horizontal, a plate resting upon the top of the rubber stopper and through which the wire and hook pass, so that the bail-wire or attachment to the bottle can be pressed in laterally against the surface of the plate and beneath the hook, substantially as set forth.

4. The combination with a hollow rubber stopper having a recess within it that is largest at the lower end, of a wire having a volute coil at its lower end to fit within the recess of the stopper and at the bottom thereof, and a hook at the upper end extending approximately horizontal, a plate resting upon the top of the rubber stopper, and through which the wire and hook pass, there being a transverse depression in the upper surface of the plate so that the bail-wire or attachment can be pressed in laterally beneath the hook and will spring into the depression, the rubber of the stopper having been slightly compressed in the operation so as to act in holding the bail-wire or attachment in the depression of the plate, substantially as set forth.

5. The combination with the bail-wire and the elastic stopper, of a plate resting upon the elastic stopper and having a central opening, a hook connected at its lower end to the elastic stopper with the hook portion approximately horizontal and slightly above the plate so that the bail-wire can be pressed laterally beneath the hook and between the same and the upper surface of the stopper, substantially as set forth.

6. The combination with the elastic stopper and the bail-wire, of a hook, the end portion of which is approximately horizontal, the space between the hook and the upper surface of the stopper being slightly less than the diameter of the bail-wire, so that the elastic stopper will be slightly compressed as the bail-wire is pressed beneath the hook and thereby there will be a friction between the hook and the bail-wire that aids in retaining the stopper in its proper position on the bail-wire when such stopper is removed from the mouth of the bottle, substantially as set forth.

Signed by me this 23d day of November, 1898.

L. H. BROOME.

Witnesses:
GEO. T. PINCKNEY,
S. T. HAVILAND.